(12) United States Patent
Celestini

(10) Patent No.: US 8,494,812 B2
(45) Date of Patent: *Jul. 23, 2013

(54) SELF-CONTAINED SYSTEM AND METHOD FOR REMOTELY MONITORING MACHINES

(75) Inventor: Stefano Celestini, Oakville (CA)

(73) Assignee: Shoplogix, Mississauga, ON (CA)

( * ) Notice: Subject to any disclaimer, the term of this patent is extended or adjusted under 35 U.S.C. 154(b) by 1391 days.

This patent is subject to a terminal disclaimer.

(21) Appl. No.: 11/463,918

(22) Filed: Aug. 11, 2006

(65) Prior Publication Data

US 2007/0005304 A1    Jan. 4, 2007

Related U.S. Application Data

(63) Continuation of application No. 10/700,671, filed on Nov. 5, 2003, now Pat. No. 7,110,918.

(51) Int. Cl.
*G06F 11/00*    (2006.01)
*G06F 11/30*    (2006.01)

(52) U.S. Cl.
USPC ............................ 702/188; 702/182; 702/186

(58) Field of Classification Search
USPC .................................. 702/182–186, 188, 189
See application file for complete search history.

(56) References Cited

U.S. PATENT DOCUMENTS

| | | | |
|---|---|---|---|
| 5,796,633 | A | 8/1998 | Burgess et al. |
| 5,805,442 | A | 9/1998 | Crater et al. |
| 6,092,018 | A | 7/2000 | Puskorius et al. |
| 6,810,362 | B2 * | 10/2004 | Adachi et al. ................. 702/187 |
| 7,110,918 | B2 * | 9/2006 | Celestini ....................... 702/186 |
| 2002/0082736 | A1 | 6/2002 | Lech et al. |
| 2002/0143460 | A1 | 10/2002 | Yasui |
| 2002/0161551 | A1 | 10/2002 | Adachi et al. |
| 2002/0169871 | A1 | 11/2002 | Cravo de Almeido et al. |
| 2002/0174178 | A1 | 11/2002 | Stawikowski |
| 2003/0014149 | A1 | 1/2003 | Kreidler et al. |

(Continued)

FOREIGN PATENT DOCUMENTS

| | | |
|---|---|---|
| EP | 0969766 | 12/1999 |
| EP | 1296232 | 3/2003 |

(Continued)

OTHER PUBLICATIONS

RS-232, Wikipedia, pp. 1-11, Nov. 2007.*

(Continued)

*Primary Examiner* — Michael Nghiem
(74) *Attorney, Agent, or Firm* — Borden Ladner Gervais LLP; Neil Henderson

(57) ABSTRACT

A machine monitoring system and method uses a machine monitoring device (MMD) which is connected to the monitored machine. Outputs from the machine are attached to input connectors on the MMD. The MMD receives inputs from the machine and performs desired transformations. Results of the transformations are stored in an on-board database system. Reports on machine status, quality, maintenance, production, and performance are generated by consulting the database system. Reports can be generated at fixed intervals or on demand and may be transmitted over a network. The MMD makes reports remotely viewable from client computing devices via web page interfaces and also allows for remote configuration of the MMD via such interfaces. The MMD also has output connectors for transmitting MMD output signals that may be used for activating buzzers, lights or email notifications that can be escalated, or pausing or stopping machines.

20 Claims, 8 Drawing Sheets

U.S. PATENT DOCUMENTS

| | | |
|---|---|---|
| 2003/0014150 A1 | 1/2003 | Flanagan et al. |
| 2003/0045964 A1 | 3/2003 | Lottgen et al. |
| 2003/0046436 A1 | 3/2003 | Govindaraj et al. |
| 2003/0081824 A1 | 5/2003 | Mennie |
| 2003/0093522 A1 | 5/2003 | Motoyama |
| 2003/0122793 A1 | 7/2003 | Takasu et al. |
| 2004/0098148 A1 | 5/2004 | Retlich et al. |
| 2005/0114502 A1 | 5/2005 | Raden et al. |

FOREIGN PATENT DOCUMENTS

| | | |
|---|---|---|
| JP | 2000020122 A | 1/2000 |
| WO | 99/56447 | 11/1999 |
| WO | 00/21312 | 4/2000 |
| WO | 01/52320 | 7/2001 |
| WO | WO 02082302 | 10/2002 |
| WO | 03/021490 | 3/2003 |

OTHER PUBLICATIONS

Merriam Webster's Collegiate Dictionary, tenth edition, 1997, p. 293.*

Derwent Abstract #2000-165041, related to JP Patent Publication No. 2000-20122 A, Jan. 21, 2000, Toshiba KK, Derwent Information Ltd.

Canadian Intellectual Property Office, Written Opinion, Mar. 30, 2005, pp. 1-5.

Canadian Intellectual Property Office, International Search Report, Mar. 30, 2005, pp. 1-3.

European Patent Office, European Search Report, Dec. 21, 2006, EP Application No. 04 79 7176.

* cited by examiner

SELF-CONTAINED SYSTEM AND METHOD FOR REMOTELY MONITORING MACHINES

RELATED APPLICATIONS

This application is a continuation of U.S. patent application Ser. No. 10/700,671, filed Nov. 5, 2003, now U.S. Pat. No. 7,110,918, issued Sep. 19, 2006, which is incorporated herein by reference.

FIELD OF THE INVENTION

The present invention relates to computer-assisted monitoring, processing, and reporting of the status and performance of machines.

BACKGROUND OF THE INVENTION

There are currently a variety of methods for monitoring and controlling the motion and status of machines in manufacturing, production, and processing environments, such as a factory. For example, processor-based controls, such as a computer numerical control (CNC), are used to control the motion of machines such as machine tools and robots that are used in a variety of manufacturing environments. A programmable logic control (PLC) may also be used to control the motion of a machine in a manufacturing, production or processing environment. Older equipment may be controlled by relays and relay logic.

All of these types of controls focus primarily on machine operation and very little on the information that the machine can provide to others. Usually, a machine control is designed to communicate directly to an operator of the machine equipment. It provides the operator with the information necessary to run the machine and make changes to the machine as needed. If one wishes to collect and analyze machine productivity, maintenance, status, quality, signal, or alarm information in real-time or over an interval of time, this information is either not available or needs to be derived from raw signals. The usual way to collect such information is manually by the operator. This implies a number of disadvantages. Typically, an operator must be present at all times to monitor the machine and the information collected is either recorded manually on paper or manually entered into a computer on the factory floor. Thus, it is possible that only a fraction of the useful information will be captured. Further, due to the high-level of human interaction required, this method is also prone to inaccuracies. In addition, the necessity of human interaction introduces delays that make this approach unsuitable for real time-decision making.

Other solutions for automated data collection and reporting involve a more complicated integration effort and rely on the machine data being stored in a database on a central server on a network. However, this signifies that machine data must constantly be sent to the central server for processing. Thus, such solutions may require additional network resources and may increase network congestion. Further, should the central server or network fail, valuable machine data will be lost and monitoring and some level of control will be jeopardized. In addition, the network, central server, and machine connections may all have to be configured separately through a variety of interfaces which may increase configuration time and complexity both during initial installation and recovery after failure of a system component.

Accordingly, what is required is a system and method that automatically monitors machines and captures data which may then be processed and reported in a manner configurable by the user. The system and method should also provide for generation of output signals, in response to the results of processing the machine data and also configurable by the user, which may be used for pausing or stopping a machine or causing lights or buzzers to be activated. The system and method should allow for viewing of reports based on processed machine data. The system and method should further allow for simple configuration of all aspects of the system, also via a convenient and familiar interface mechanism. Users should be able to view and request reports, as well as effect system configuration, remotely from a client computing device on a network. To minimize reliability issues and network traffic, however, such a system should provide integrated data processing and storage, management and storage of configuration information, output signal generation, report generation in a variety of formats, as well as the mechanism for generating the user interfaces, within one machine monitoring device. The machine monitoring device should also contain connectors that allow desired machines to be easily connected to the machine monitoring device and to connect the machine monitoring device to the network. Thus, the machine monitoring device should constitute a self-contained unit that acts as a server to provide all desired services to users on the client computing devices, which should act as clients of the machine monitoring device. The present invention addresses the various requirements identified above.

SUMMARY OF THE INVENTION

The present invention relates to a computer-assisted machine monitoring system and method. The invention uses a compact machine monitoring device (MMD) connected to a machine. The MMD comprises a central processing unit (CPU), software modules, storage capabilities, a number of connectors for input and output for the machine to which the MMD is connected, serial ports, and ports for connection to a network. The input connectors accept a variety of types of inputs (digital, analog), allowing for simple connection to almost any machine. The output connectors, such as digital output connectors or the like, of the MMD carry MMD output signals generated by the MMD, in response to data received from the input connectors and processed by the MMD, to any machine or device attached to the output connector. These output signals may be used for a variety of purposes, including, for example, pausing a machine, stopping a machine, and instructing a machine to continue operation, as well as activating or deactivating physical signals connected to the output connector such as lights, buzzers or the like. Serial ports, such as RS232 or RS485 or the like, allow for serial input and output between the MMD and the machine and other devices.

The MMD software modules include an engine that transforms data input received from the machine connected to the MMD to capture information desired by the user for inclusion in reports. The engine also generates MMD output signals and automated e-mail notifications based on machine data input received and transformations effected. Data transformed by the engine for inclusion in the reports is stored in an on-board database system module resident on the MMD. Reports are created by two software modules. Reports requested specifically for viewing by users may be generated on user request by a server software module, such as a web server, on the MMD which generates the requested report and outputs the report via a user interface, such as a web page, also generated by the server software module. Reports may also be automatically generated and output, without user interfaces or user requests, to a client computing device (CD) on the network by a separate reporter module for archiving purposes or use by other applications. Report content, report format, data transformations by the engine, MMD inputs from machines, and MMD output signals are set out in configuration information which is stored and distributed to other software modules by a configuration interface module. Data is entered into this module via user interfaces generated by the server. The server that generates the user interfaces for reports and configuration may be a world wide web server (web server) that generates user interfaces in the form of world wide web pages (web pages) or the like.

According to another aspect of the invention, a method for monitoring machines using an MMD comprises three steps. Beginning with the configuration step, the user determines which reports are desired and the information required, connects the MMD to the machine and to the network, and configures the MMD network connections, MMD inputs and MMD output signals, e-mail notifications, and reports. Once network connectivity is established, this configuration step is carried out using the user interfaces provided by the server module. Next, during the monitoring step, the engine monitors the machine for changes in input, operates desired transformations on the input changes to produce variable changes for inclusion in reports, forwards the reports to the database system for storage, and generates output signals in response to inputs from machines and the results of transformations effected. Finally, during the reporting step, modules that generate reports query the database system to generate reports that are output either to users for viewing in a user interface on the CD or for archiving and use by other applications on a CD.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

The present invention provides a computer-assisted system and method for remotely monitoring and controlling machines in a wide variety of environments. Specifically, the invention facilitates remote monitoring of machines via a self-contained machine monitoring device (MMD) which is connected to one or more client computing devices (CDs) on a network. The MMD is a compact device containing a processing engine, a server for generating displays and user interfaces, a database system, and machine and network connectivity capabilities. The MMD provides all machine and network connectivity, machine input and output, data storage and processing, reporting, user interface generation, and system configuration capabilities. As such, it furnishes a complete, self-contained, and compact system, readily attachable to almost any machine. Since the MMD provides self-contained data storage, processing, configuration and reporting services, it is not dependent on external computers for any of these functions, but remains capable of transmitting reports for archival storage on a CD if desired, thus increasing reliability and reducing network traffic. In fact, for all functions, the MMD constitutes a self contained unit that acts as a server to the CDs. The CDs, in turn, act as client mechanisms for remotely requesting, storing and viewing report data and remotely entering and viewing MMD configuration information.

Figure 1:
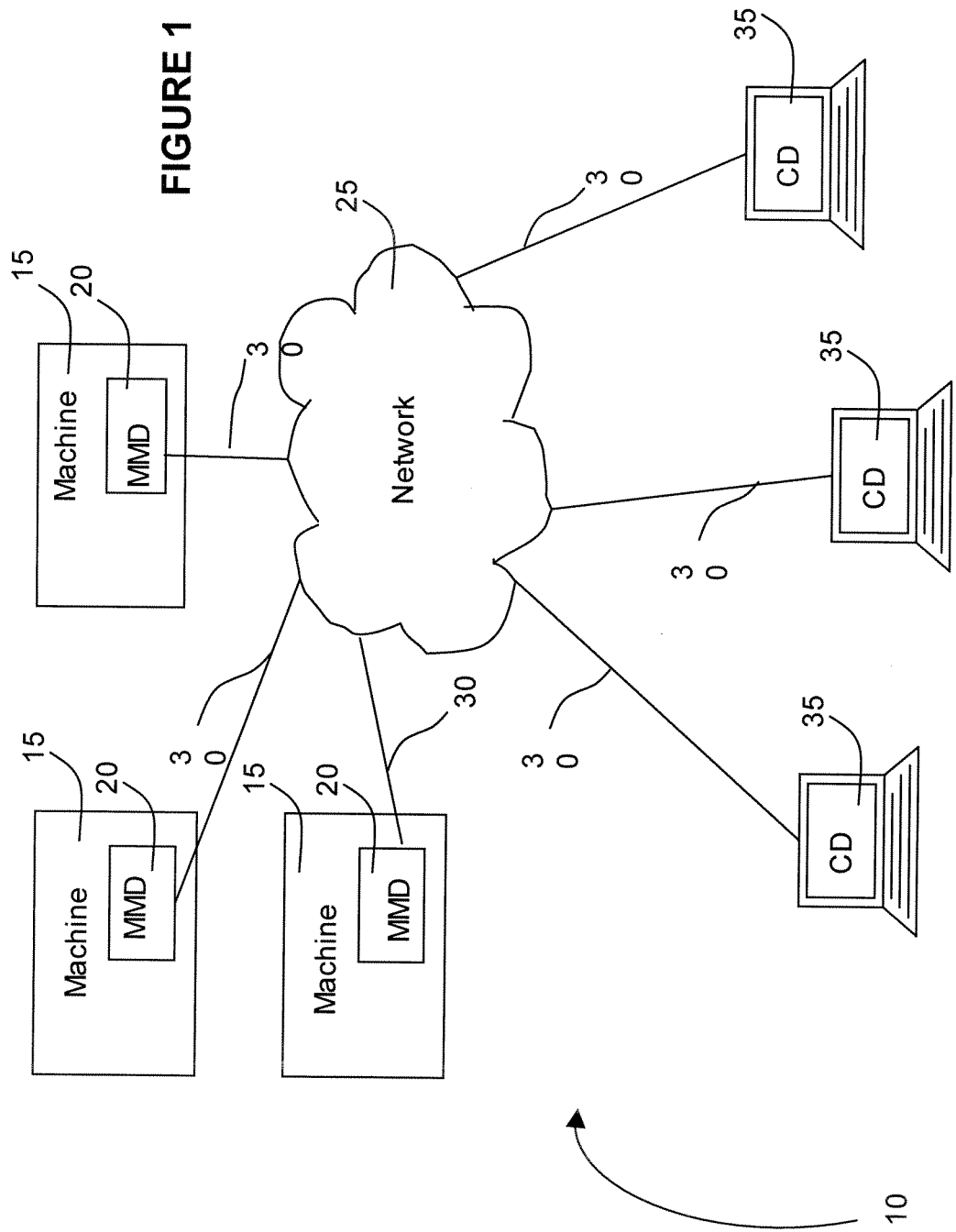
FIG. 1 is a block diagram of a system utilizing the present inventions.

Reference is first made to FIG. 1, a block diagram of a system utilizing the present invention shown generally as 10. One or more machines 15 is connected to an MMD 20. A machine 15 may comprise a device of any type, as long as the device provides outputs and, if desired, inputs that may be attached to the MMD 20. These outputs and inputs may include, for example, digital inputs digital outputs, analog inputs analog outputs serial communications, and network, such as Ethernet, communications. As such, machines 15 may include any devices having simple digital or analog outputs, Programmable Logic Controls (PLCs), Computer Numeric Controls (CNCs), Ethernet ports, or serial ports for RS232/RS485 connections, among others. The MMD 20 may generate MMD 20 output signals, such as digital output signals or the like, in response to data received from the machine 15 and processed by the MMD 20, which may be transmitted on the MMD 20 to any machine 15 attached to an MMD 20 output connector, MMD 20 serial ports, or MMD 20 network ports. These MMD 20 output signals may be used for a variety of purposes, including, for example, pausing a machine 15, stopping a machine 15, and instructing a machine 15 to continue operation, as well as activating or deactivating user notification devices such as lights, buzzers or the like. Other types of inputs to the MMD 20 and outputs from the MMD 20 are possible. It is not the intention of the inventors to limit input and output types and their possible uses to a given connection type, communication protocol, or specific type of machine 15.

Each MMD 20 is attached to a network 25 and acts as a server for all machine 15 control and monitoring functions. The network 25 used may be a local area network, wide area network, an intranet, the Internet, wireless network, or any combination of the aforementioned network types. However, the network types mentioned serve only as examples. It is not the intent of the inventors to restrict the use of the present invention to a specific network type or protocol.

Data from the MMD 20 is transmitted over a data link 30 from the MMD 20 to the network 25 where it is transported to a client computing device (CD) 35 via a data link 30 from the network 25 to the CD 35. The CD 35 may be any type of computing device capable of receiving, transmitting, and displaying data in the format provided by the network 25 and the MMD 20. A CD 35 may comprise, among other devices, personal computers, handheld computers, personal data assistants (PDA), and cellular phones. The data links 30 between the MMD 20 and the network 25 and the CD 35 may be either wireless data links or wire line data links, provided they can carry data in the protocol used by the MMD 20 and the CD 35.

The CD 35 is used for remotely configuring the MMD 20, for remotely requesting and viewing reports from the MMD 20, and for receiving copies and back-ups of report data in another format if desired. All configuration and report requesting and viewing transactions are carried out via user interfaces generated by the MMD 20. MMD 20 handles all of the instructions, processing, configuration requests, report generation, and data storage. The MMD 20 also generates all back-up report data that may eventually be sent to a CD 35 on the network 25, MMD 20 output signal generation, as well e-mail notifications in response to given machine 15 inputs, such as alarms, depending on the MMD 20 configuration. Reports and configuration information are requested by users and displayed via user interfaces generated by the MMD 20 and transmitted to a CD 35 where the user views reports and configuration. Configuration information and report request parameters are also entered via user interfaces generated by the MMD 20. Thus, the MMD 20 handles all data processing, configuration, monitoring, user interface generation, and reporting and constitutes a self-contained unit for all such services. As such, the MMD 20 acts as a server to the CDs 35. The CD 35 is only used for inputting requests, displaying results output by the MMD 20, and for archiving of MMD 20 reports on a CD 35 elsewhere on the network 25, if desired.

In one embodiment of the invention, the user interfaces for entering report requests and configuration information and for viewing the reports and configuration information are comprised of web pages in world wide web format wherein configuration information and report requests are entered and configuration and reports requested are displayed in a web browser on a user's CD 35. These web page user interfaces use Hypertext Markup Language (HTML) to control the overall layout of the user interfaces Extensible Markup Language (XML) to define the data structures used for inputs and outputs to the user interfaces, and JAVA programming applets to display any requested reports in graphical format. Reports may also automatically output, without user viewing, to a CD 35 on the network 25 in a format such as comma separated values (CSV) or in Microsoft Excel™ format for archiving purposes or use by other applications.

In addition, a designated MMD 20 can monitor the running status of all of the other MMDs 20 and provide a web page user interface that facilitates access to reports on any MMD 20 connected to the network 25. Upon user request, the designated MMD 20 generates a web page user interface viewable on a CD 35, that contains a list, for example a hierarchal tree, of all the MMDs 20 within a frame on the web page. The user may then select the MMD 20 attached to the machine 15 that the user wishes to view from the list, which causes the selected MMD 20 to generate a web page to allow the user to view/select reports available on the MMD 20 chosen in another frame on the web page designated for report viewing. It is also possible for a designated MMD 20 to generate reports that compile data from reports output from multiple MMDs 20.

The user interfaces, report formats, and language tools used to generate the user interfaces for the present embodiment are exemplary. The user interfaces used and generated by the MMD 20 for presenting reports to the user and for entering configuration and report requests may be of any type that may be readily displayed by the CD 35. It is not the intent of the inventors to restrict the use of the present invention to a given reporting type format, user interface mechanism, or language for developing and displaying reports or user interfaces. Thus, it is not the intent of the inventors to limit user interfaces to interfaces in the form of world wide web pages or to limit the type of server to a world wide web server that generates such interfaces in the form of world wide web pages.

Figure 2:
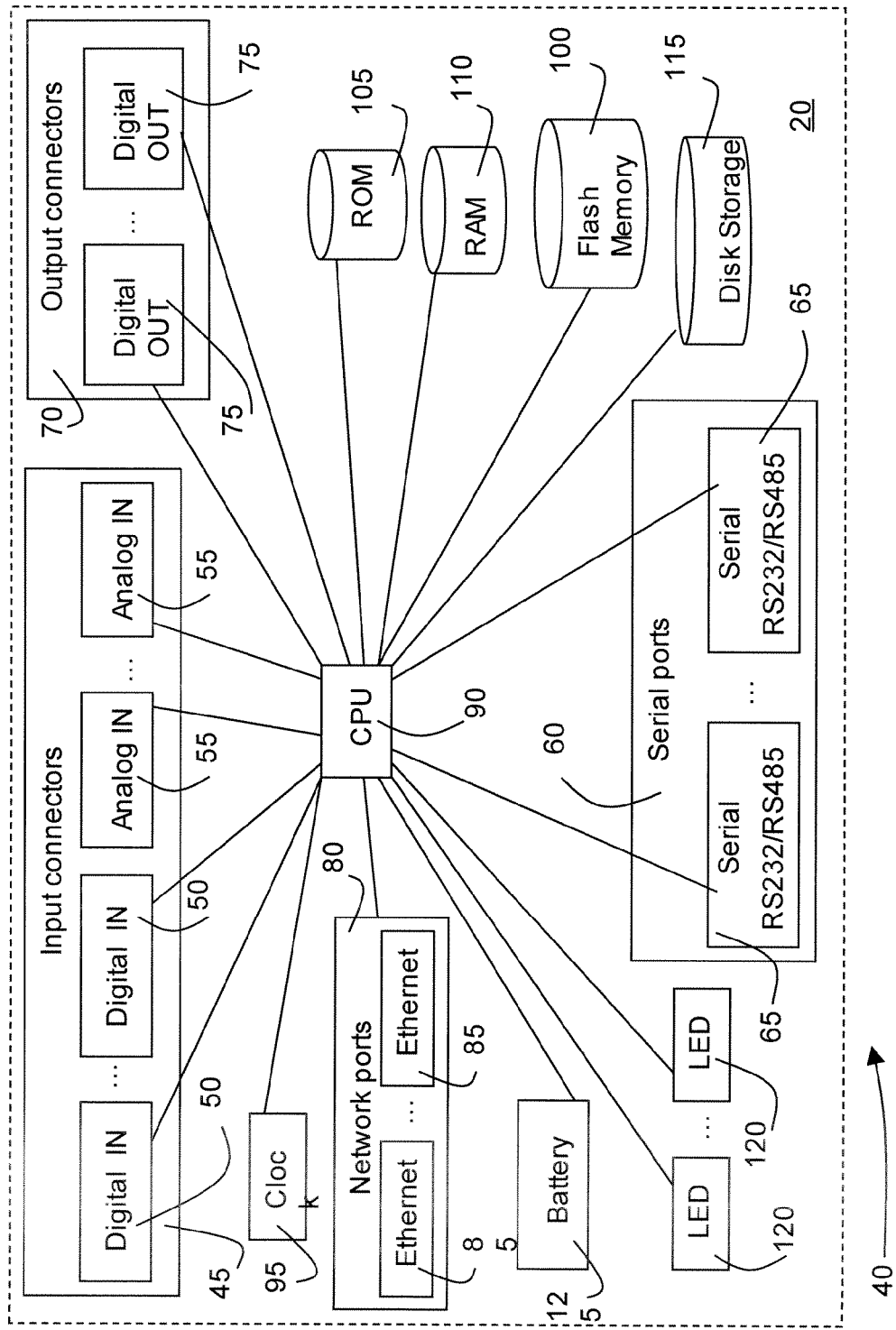
FIG. 2 is a block diagram of the hardware components of the MMD.

Referring now to FIG. 2, a block diagram of the hardware components of the MMD is shown generally as 40. The MMD 20 contains a variety of connectors and ports for inputs from, and outputs to, a machine 15. Input connectors 45 may include digital input connectors 50 which assure that the MMD 20 can receive digital inputs, i.e. inputs in digital format, from the connected machine 15. Similarly, the MMD 20 may possess one or more analog input connectors 55 which allow the MMD 20 to receive analog inputs, i.e. inputs in the form of analog signals. The MMD 20 may also include one or more serial ports 60, such as RS232 or RS485 (COM) ports 65 or the like, for serial communications, including serial input and serial output, with machines 15 capable of using such serial ports 60. These serial ports 60 are also used for handling serial protocol communications. This may include, for example, communication from manual input devices such as handheld terminals and barcode scanners as well as outputs to Light Emitting Diode (LED) display boards. The MMD 20 may also contain one or more output connectors 70, such as a digital output connector 75, for sending MMD 20 output signals instructions to a connected machine 15 or other connected device. Finally, one or more network ports 80, such as an Ethernet port 85 or the like, on the MMD 20 assure network 25 communications to CDs 35 or machines 15 capable of using network protocols. Machines 25 capable of using network protocols, such as Ethernet or the like, may be indirectly connected to the MMD 20 by communicating with the MMD 20 over the network 25.

The MMD 20 also contains a number of elements that allow the MMD 20 to act as a self-contained computing device. Instructions and operations for MMD 20 are controlled by a Central Processing Unit (CPU) 90. Synchronization of activities and instructions are carried out by reference to a real time clock 95. MMD 20 and machine 15 data is stored in flash memory 100, read-only-memory (ROM) 105, random-access-memory (RAM) 110, on an internal disk 115, or other storage media, not shown, internal to the MMD 20. The MMD 20 may also have one or more LEDs 120 for indicating MMD 20 power status and the status of various MMD 20 input connectors 45, output connectors 70, serial ports 60 and network ports 80.

In one embodiment, the MMD 20 comprises a plurality of digital input connectors 50, a plurality of analog input connectors 55, a plurality of serial RS232 ports 65, one software selectable serial RS232/RS485 port 65, and a plurality of digital output connectors 75. Configuration information is stored in the read/write flash memory 100, which allows for preservation of configuration information in the event of a power failure. A long-life battery 125 functions as a power back-up mechanism and ensures that the MMD 20 can continue functioning in the event of such a failure. The MMD 20 reads and stores other useful data via ROM 105 and RAM 110, or disk storage 115. Should connections to the network 25 cease to function, this data can be forwarded on to a CD 35 when network 25 connections are re-established. Thus, the MMD 20 may retain its configuration information and continue temporarily to monitor the machine 15, without data loss, even in the event of a power or network 25 failure. The MMD 20 also includes a plurality of MMD LEDs 120 for indicating the status of the input voltage, digital input connectors 50, digital output connectors 75, COM1 serial (RS232/RS485) port 65, and network connectivity via the Ethernet port 85. The Ethernet port 85 may also be used to communicate with machines 15 capable of Ethernet communications. Other than a CD 35, machines 15 capable of Ethernet communications will often not be directly attached to the MMD 20. Rather, they will communicate with the MMD 20 over the network 25. As one skilled in the art will recognize, however, other combinations for use of memory, battery 125 backup capability, input connectors 45, output connectors 70, serial ports 60, network ports 80, and use of LEDs 120 are possible.

Figure 3:
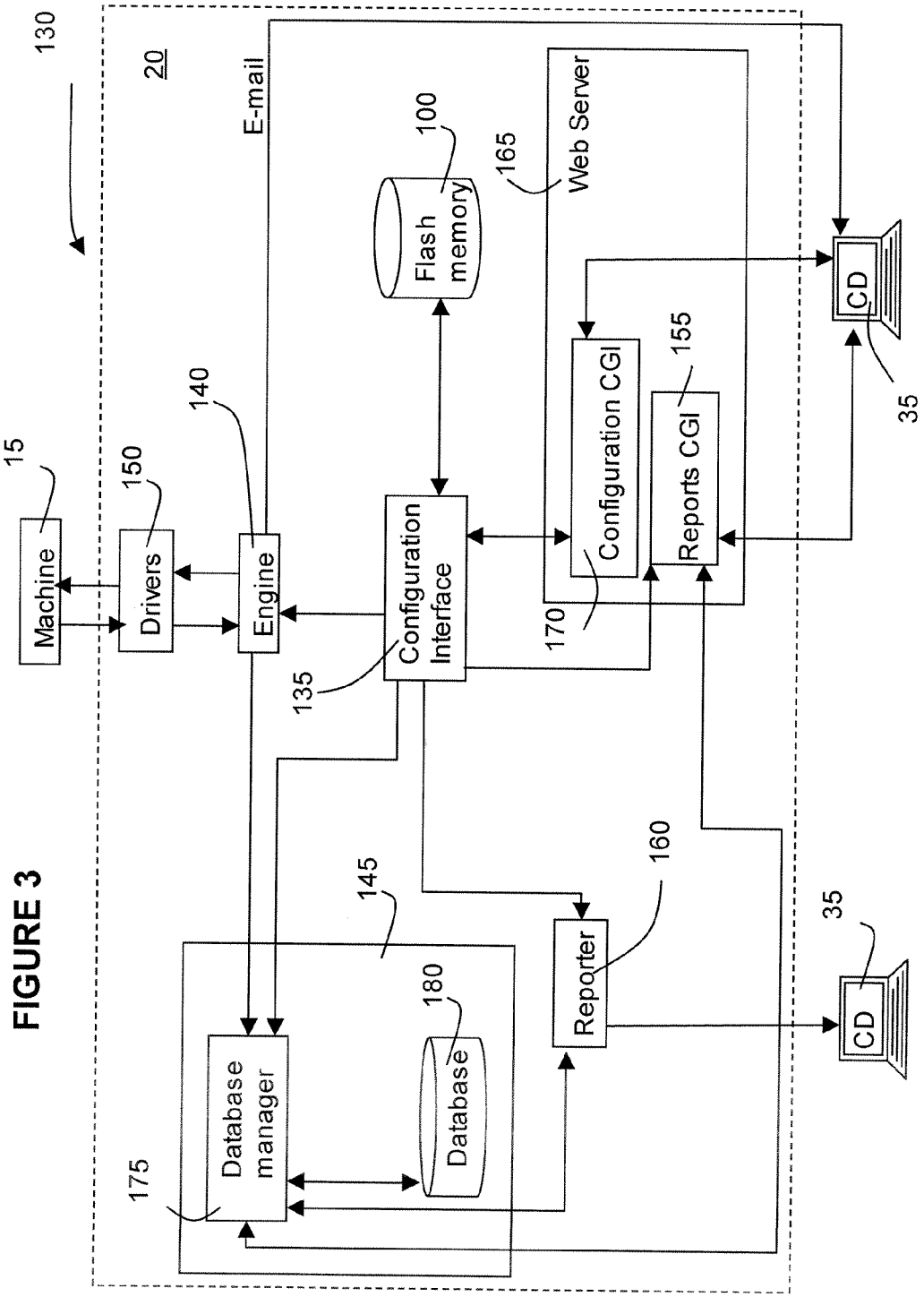
FIG. 3 is a logical flow diagram of the software modules of the MMD.

Reference is now made to FIG. 3, a logical flow diagram of the software modules of the MMD 20, shown generally as 130. To aid the reader in understanding the logical flow of the modules of MMD 20, we will also be referring to features of FIG. 2.

In brief, the software modules are comprised of the following: a configuration interface module 135 for managing configuration information, an engine 140 for performing transformations on machine inputs and generating outputs based on the machine inputs, a database system 145 for storing report data, drivers 150 for translating machine inputs to a format useable by the engine and engine outputs for use by machines, a reports Common Gateway Interface (CGI) module 155 and reporter module 160 which generate reports, and a web server 165 or the like for generating user interfaces for requesting and viewing reports and for entering and viewing configuration information, as well as handling all input from the user interfaces. The reports CGI module 155 is comprised within the web server 165 and specifically handles all user requests for reports and outputs the reports in the form of web page user interfaces. The web server further comprises a configuration CGI module 170 which specifically handles generation of web page user interfaces for entering and viewing configuration information. The database system 145 is further comprised of a database manager 175 and a database 180. The database manager 175 reads and writes data to the database 180 which stores the actual information required for report generation. These modules are explained in greater detail below.

The configuration interface module 135 stores and manages the MMD configuration information, which is stored in flash memory 100. The configuration information is determined primarily as a function of the reports that must be generated and includes variable names for inputs from machines and outputs required for reports, transformations to be performed by the engine, structure of the database 180 within the database system 145, report formats, and queries.

The configuration interface module 135 is the only module that can read or write to the flash memory 100 that contains the configuration information. Thus, the configuration interface module 135 is used for reading and writing of configuration information for the MMD 20 to the flash memory 100 during the initial MMD 20 configuration and after configuration changes. As such, the configuration interface module 135 interacts with the configuration CGI module 170, which generates the web page interface through which the user enters and views configuration information on the CD 35. The configuration CGI module 170 transmits configuration information entered by the user to the configuration interface module 135, which then writes this information to the flash memory 100. In addition, the configuration interface module 135 also supplies all necessary configuration information, by reading from the flash memory 100, to all other modules after configuration changes or during MMD 20 initialization. The other modules receive this information during initialization and store it in memory for subsequent use. Thus, once the other modules have been initialized with the configuration information, the configuration interface module 135 does not need to provide this information again unless there is a change in configuration or system re-start, such as after a power failure, etc. By using the configuration interface module 135 as an intermediary between all other modules and the configuration information stored in the flash memory 100, the MMD 20 ensures that each module is furnished with the configuration information required for the module's tasks and that only one module accesses the configuration information in the flash memory 100 at any given moment.

The configuration interface module 135 also maintains, as part of the configuration information, user names and passwords. Users may thus use these passwords, from web page user interfaces, to view and modify system configuration information as required for the daily use of the system. Different levels of access and modification permissions are accorded to users based on their classification as belonging to a group having certain access and modification rights. For example, there could be three groups of users, such as basic users, administrators, and integrators, with basic users having the least rights, administrators having additional rights, and integrators having the most rights. In this manner, the ability to effect necessary modifications to the configuration information is ensured while maintaining security.

The engine 140 monitors machine inputs via the drivers 150 for changes to determine whether the value received for a given input is not the same as the previous value received for that input, in which case an input change is detected. More specifically, the drivers 150 receive the inputs from the digital input connectors 50, analog input connectors 55, and serial RS232/RS285 ports 65 and translate them into a format useable by the engine 140. For each input, there is a variable associated with the input's value. The engine 140 compares the last value received for each input, as contained in the variable associated with the input, with the current value of the input.

If an input change is detected, the engine 140 applies transformations to the input value for which an input change has been detected. These transformations may include basic mathematical transformations such as multiplication or division, Boolean logic, comparison with other values, and transformation for measuring and comparing inputs or variables over a given period of time. An example of possible transformations is shown in Table 1.

TABLE 1

| Operation | # of inputs | Result Variable Value |
| --- | --- | --- |
| Copy | 1 | copy of the input variable |
| Invert | 1 | Boolean inverse of the input variable |
| Bitwise Invert | 1 | bitwise invert of the input variable |
| Absolute Value | 1 | absolute value of the input variable |
| Plus + | 2 | Input1 + Input2 |
| Minus − | 2 | Input1 − Input2 |
| Multiplied By * | 2 | Input1 * Input2 |
| Divided By/ | 2 | Input1/Input2 |
| Less Than < | 2 | TRUE if Input1 < Input2 otherwise FALSE |
| Greater Than > | 2 | TRUE if Input1 > Input2 otherwise FALSE |
| Less Than or Equal To <= | 2 | TRUE if Input1 <= Input2 otherwise FALSE |
| Greater Than or Equal To >= | 2 | TRUE if Input1 >= Input2 otherwise FALSE |
| Is Equal To == | 2 | TRUE if Input1 equals Input2 otherwise FALSE |
| Is Not Equal To != | 2 | TRUE if Input1 is not equal to Input2 otherwise FALSE |
| And | 2 | TRUE if Input1 is TRUE and Input2 is TRUE otherwise FALSE |
| Or | 2 | TRUE if Input1 is TRUE or Input2 is TRUE or both are TRUE otherwise FALSE |
| Exclusive Or | 2 | TRUE if only Input1 is TRUE or only Input2 is TRUE otherwise FALSE |
| Round | 2 | Rounds Input1 to accuracy specified by Input2 |

TABLE 1-continued

| Operation | # of inputs | Result Variable Value |
|---|---|---|
| Value Sampling | 2 | Copies Input1 but only at fixed time intervals which are specified by Input2 |
| Deadband | 2 | Copies Input1 but only if its value has changed by the amount specified by Input2 |
| Timer (seconds) | 1 | # of seconds that Input1 has been TRUE for |
| Counter | 1 | # of times that Input1 has been TRUE |
| Limit Output Range | 3 | Copies Input1 but only if its value is within the specified Lower Limit and Upper Limit |
| Max Over Time | 2 | maximum value that Input1 has had over the time period specified by Input2 |
| Min Over Time | 2 | minimum value that Input1 has had over the time period specified by Input2 |
| Spread Over Time | 2 | maximum value that Input1 has had over the time period specified by Input2 |
| Count Over Time | 2 | # of times that Input1 has been TRUE over the time period specified by Input2 |
| Average Cycle Time | 2 | ratio of seconds to # of times that Input1 has been TRUE over the time period specified by Input2 |

The result of each transformation is another variable designated to hold the value of the result of the transformation. As such, an input change may undergo a number of transformations, using a number of intermediate variables, until the result required for inclusion as a field in a report or for display as a graph in a report, referred to as a report variable, is calculated. Variables required for such displays are referred to as report variables. When the engine 140 is finished processing the input change, it forward the results, i.e. any resulting report variables, to the database manager 175. Only changes in the value of report variables, referred to as report variable changes, are transmitted by the engine 140 to the database manager 175 for storage in the database 180.

By limiting any transformations on inputs with a view to transmission to the database manager 175 to those cases where an input change is detected, as opposed to using more traditional methods of processing and storing all inputs on a constant basis, the engine 140 consumes less resources. The fact that only report variable changes are sent by the engine to the database manager 175 and recorded in the database 180 further minimizes storage requirements and processing resources required. However, since the engine 140 is constantly monitoring all inputs received from the machine 15, input changes are detected and variable changes are calculated and stored almost instantly, thus ensuring precision of the MMD 20 reports is not compromised.

The engine 140, may also generate engine outputs in the form of MMD 20 output signals and e-mail notifications in response to inputs from machines 15, whether there has been an input change or not, or in response to the result of transformations undertaken by the engine 140 in response to an input change. For example, the engine 140 could generate instructions to activate or deactivate a PLC, relay, or LED that would be sent, via the drivers 150, over a digital output connector 75. E-mail notifications may be sent with a time delay, or to one or more recipients, the identity and quantity of recipients also being dependent on the results of the handling of the input Such e-mails would be sent via the Ethernet port 85.

Variable names and the exact transformations applied by the engine 140, are dependent on the reports which must be made available and instructions for handling inputs, both of which are set out in the configuration information. This information is transmitted to the engine 140 by the configuration interface module 135 when the engine 140 is initialized or after a configuration change. The engine 140 may also use thresholds provided in the configuration information during transformation of the input change to determine whether the resulting variable is significant enough to be handled/transformed further and transmitted to the database manager 175 or not. Engine outputs, namely digital outputs for MMD 20 output signals and e-mail notifications performed by the engine 140, are also governed by the configuration information.

The database 180 is the repository for report variables required for generating the reports. It receives and outputs information via the database manager 175. The database manager 175 is the only module that has direct access to the database 180. All other modules that need read/write access to the database 180 must use the database manager 175. In this fashion, the database manager 175 ensures that only one module can access data from the database 180 at any given time, thus ensuring that data integrity is not compromised by one module writing to the database 180 while another module is reading from it.

In particular, the database manager 175 executes Structured Query Language (SQL) queries received from the reports CGI module 155 and reporter module 160 and extracts and processes data from the database 180 as required by the queries. The database manager 175 then forwards the results of these queries, generally as collections of records, to the reports CGI module 155 and reporter module 160 which output them as required.

The exact contents and structure of the database 180 are dependent on the data inputs from the machine 15, the transformations and report variable changes resulting from treatment by the engine 140, and the database 180 structure. The database structure is based on the report variables which must be stored so as to be entered as in fields or displayed as graphs in the desired reports as set out in the configuration information. The database manager 175 establishes the database 180 structure, in accordance with this configuration information, and reads and writes records and fields of the database 180 in accordance with this structure. The configuration information is transmitted to the database manager 175 by the configuration interface module 135 upon initialization of the database manager 175 after powering up the MMD 20 or after a configuration change. For each report specified in the configuration information, there is a corresponding table in the database 180. Each report variable, as established in the report configuration information, constitutes a field within each record of the table assigned to that report. Each record within a table captures all of the values for the report variables required for the record as well as the time at which these variables held that value. New records are input to a table in the database 180 only when there is a change in one or more report variables required for the record. In this manner, processing resources and storage space required for the database 180 are reduced.

For example, suppose a report indicating whether a machine 15 is running or not is set out in the report configuration information. Upon initialization, the configuration interface module 135 will transmit the names of the report variable used to capture the running status to the machine 15 for display in the report and an identifier for the report to the database manager 175. The database manager 175 will then execute an SQL command to cause a table bearing the identifier's name to be created in the database 180. Each record in the table will include a field for the value of the report variable that represents the running status of the machine 15, as well as a field for the time at which the report variable for the running status of the machine 15 acquired that value. When the value for the report variable changes, after processing by the engine 140 and submission of the new value to the database manager 175, the database manager 175 causes a new record to be created in the table which captures the new value and the time at which the change in value occurred.

Although the present embodiment makes use of a relational database, it is not the intention of the inventors to restrict the database 180 or database manager 175 to a relational format. A person skilled in the art will recognize that other formats for the database 180 and database manager 175 are possible.

The drivers 150 are responsible for handling inputs from and outputs to machines 15 connected to the MMD via the digital input connectors 50, analog input connectors 55, digital output connectors 75, Ethernet port 85, and serial RS232/RS485 ports 65. As such, the drivers 150 can handle digital inputs, analog inputs, and serial communications and provide such inputs in a format useful to the engine 140. In turn, the engine 140 uses drivers 150 to forward the engine 140 outputs that the engine 140 generates to the appropriate output connectors 70, RS232/RS485 serial ports 65, or Ethernet port 85. For example, MMD 20 digital output signals could be transmitted to a machine 15 connected to a digital output connector 75 via drivers 150.

The web server 165 generates all user interfaces and handles all input and output to them. The interfaces are displayed as web pages in a web browser on a CD 35, from which the user enters information into the web page and views results. More specifically, the web server 165 generates web page user interfaces for requesting reports and entering report parameters. This functionality is ensured by the reports CGI module 155 which is comprised within the web server 165. In addition, the web server 165 also ensures generation of web page user interfaces for entering and viewing the configuration information via the configuration CGI module 170, also comprised within the web server 165. It should be noted that the configuration CGI module 170 and reports CGI module 155 do not necessarily have to be implemented within the web server 165 and could instead be implemented as external modules to the web server 165, yet resident on the MMD 20, that would provide data from which the web server 165 would generate and transmit the required web page user interfaces. It is not the intention of the inventors to restrict the exact placement within the MMD 20 of the reports CGI module 155 or configuration CGI module 170 with regard to the web server 165.

The reports CGI module 155 is a module that generates reports and which is comprised within the web server 165. The reports CGI module 155 provides a user friendly, web page interface for generating MMD 20 reports on the connected machine's 15 status. When a user requests to view the reports available for a machine 15, the reports CGI module 155 generates a web page containing a menu of reports to view. The user may then select a report and enter the desired report parameters into the web page interface provided by the reports CGI module 155 to the CD 35 for the report selected. The parameters typically involve time intervals, referred to as shifts, for monitoring the machine 15 between a scheduled start and end time for workers or machines 15. The reports CGI module 155 then uses the parameters input by the user to generate an SQL query which is sent to the database manager 175. The database manager 175 executes the query to obtain the desired information from the database 180 and transmits the results to the reports CGI module 155. The reports CGI module 155 uses this information to generate a web page containing the selected report which is transmitted to the user's CD 35. The contents and structure of the reports, which dictate the SQL queries, are output to the reports CGI module 155 by the configuration interface module 135 during initialization.

The reports CGI module 155 is capable of modifying reports in real-time in response to changes in inputs, as handled by the engine 140 and database manager 175 and set out during configuration, to allow a user to see changes as they occur. Using templates that set out each basic type of report the reports CGI module 155 generates HTML files to control the appearance of the web pages, java applets to generate graphs, and XML files to contain and describe data structures used by the reports.

The reporter module also generates reports. However, reports generated by the reporter module 160 are not requested and displayed via user interfaces generated by the reports CGI module 155 of the web server 165. Rather, if so configured, the reporter module 160 automatically generates and writes backups of all MMD 20 reports to a CD 35 on the network 25 at pre-determined time intervals. The time intervals, contents of the reports, and format of the reports are output to the reporter module 160 by the configuration interface module 135 during initialization. The reporter module 160 uses this information to generate an SQL query at the pre-configured time intervals and transmits the query to the database manager 175. The database manager 175 executes the query to obtain the desired information from the database 180 and transmits the results to the reporter module 160. The reporter module 160 then uses this information to generate a report which it transmits to the designated CD 35 on the network. The report may be output in a format such as Microsoft Excel or CSV format, depending on the configuration information. Reports can be stored on the designated CD 35 either as a single continuous file for all reports or as a separate file for each period of time, which may represent a work shift within the production environment, defined in the configuration information.

The configuration CGI module 170 provides an easy to use, user-friendly web page user interface for configuring all of the MMD 20 settings. It is comprised within the web server 165. More specifically, the configuration CGI module 170 generates HTML web pages into which configuration information may be entered or viewed. These web pages are created based on templates which contain the basic web page structure for each type of configuration information to be entered or displayed. Using the templates, the configuration CGI module 170 generates HTML files to control the overall appearance of the configuration web pages while storing data structure information required for the web pages in XML files. The user enters configuration information in the web page interface transmitted to the CD 35 via the configuration CGI module 170. In addition, the configuration CGI module 170 also allows a user to upload or download existing configurations to/from a networked CD 35. Once the configuration information is entered, the configuration CGI module 170 reads/writes the information to the configuration interface module 135, which in turn reads/writes the data to the flash memory 100.

Although the present embodiment makes use of HTML, XML, and JAVA to define web page interfaces and/or reports, it is not the intention of the inventors to restrict such interfaces and/or reports to a web base format or to use a particular language to generate the web pages. A person skilled in the art will recognize that other formats for the reports are possible and that other languages or tools may be used to generate them.

It should be apparent to one skilled in the art that the placing of the input connectors 45 and/or output connectors 70, serial ports 60, network ports 80, engine 140, drivers 150, database system 145, reporter module 160, configuration interface module 135, and web server 165 has a positive cumulative effect on reliability and use of network 25 resources. All user configuration entries and displays, as well as report generation, are handled on-board via the web server 165, including the reports CGI module 155 and configuration CGI module 170, and reporter module 160. On-board storage of machine 15 report data is assured by the database system 145, comprised of the database manager 175 and database 180. All required hardware capabilities for processing for machine 15 inputs and engine 140 outputs, as well as serial and network communications are also located within the MMD 20. For all of these functions, the MMD 20 constitutes a self-contained unit and acts as a server to the CDs 35 over the network 25 for, thereby eliminating the need for a central server elsewhere and increasing reliability. Since almost all MMD 20 data processing and interface generation is also handled within the MMD 20, network 25 traffic is also reduced.

Figure 4:
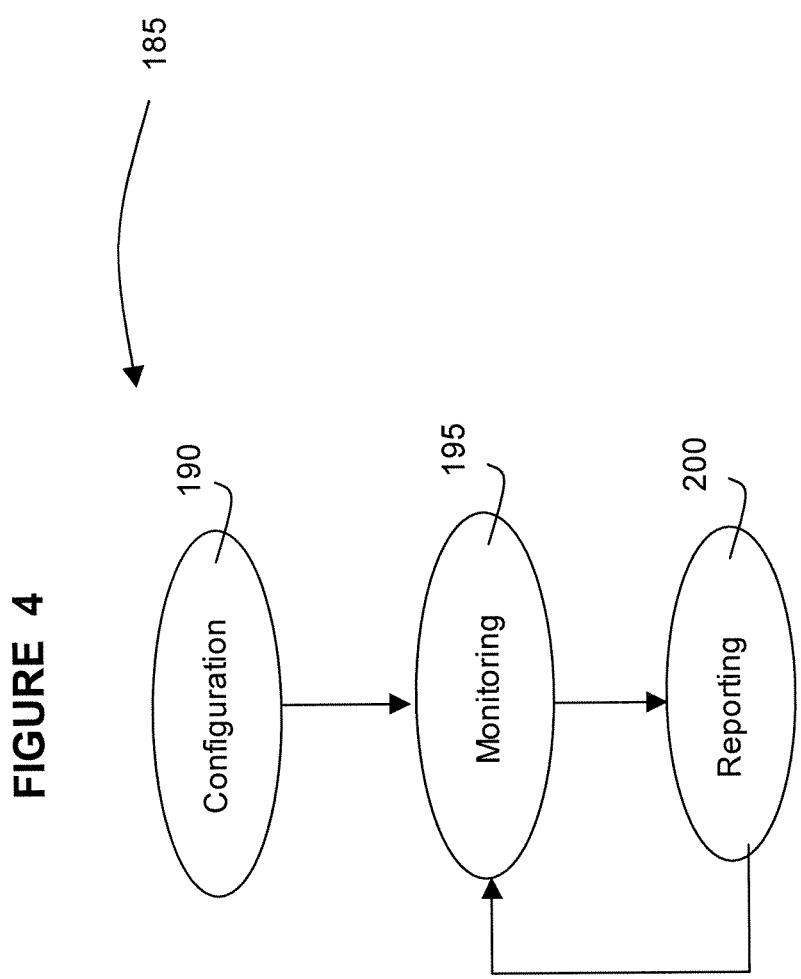
FIG. 4 is a flowchart of a method for using the present invention.

FIG. 4 is flowchart of a method for using the present invention, shown generally as 185. It demonstrates the overall method for use of the invention. Beginning at the configuration step 190, the MMD 20 is configured by the user. This includes connecting the machine 15 to the MMD 20 and configuring reports, variables, network ports 80 and connections, serial communications via serial ports 60, machine 15 inputs via input connectors 45 and MMD 20 output signals via output connectors 70. At the end of this step 165, required configuration information is transmitted to the software modules. The MMD 20 software modules are then initialized with the configuration information. Next, at the monitoring step 195, the MMD 20 monitors the machine 15. During this step 195, the engine 140 monitors and transforms the machine's 15 inputs, provides engine 140 outputs as configured, and sends necessary information as report variable changes to the database system 145. Next, at the reporting step 200, the MMD 20 generates reports as requested by the user and transmits them to the user via a user interface generated by the web server 165 and displayed on the user's CD 35. The MMD 20 also generates reports automatically, via the reporter module 160, at given intervals and formats, as configured, and sends the reports to a CD 35 via the network 25 for archiving or processing by other applications. It should be noted that the monitoring step 195 is ongoing and is constantly repeated, even while reports are being generated automatically and requested by the user during the reporting step 200. Thus the monitoring step 195 and reporting step 200 constitute an ongoing cycle that continues until the MMD 20 is disabled, not shown, or there is a change in MMD 20 configuration, not shown.

Figure 5:
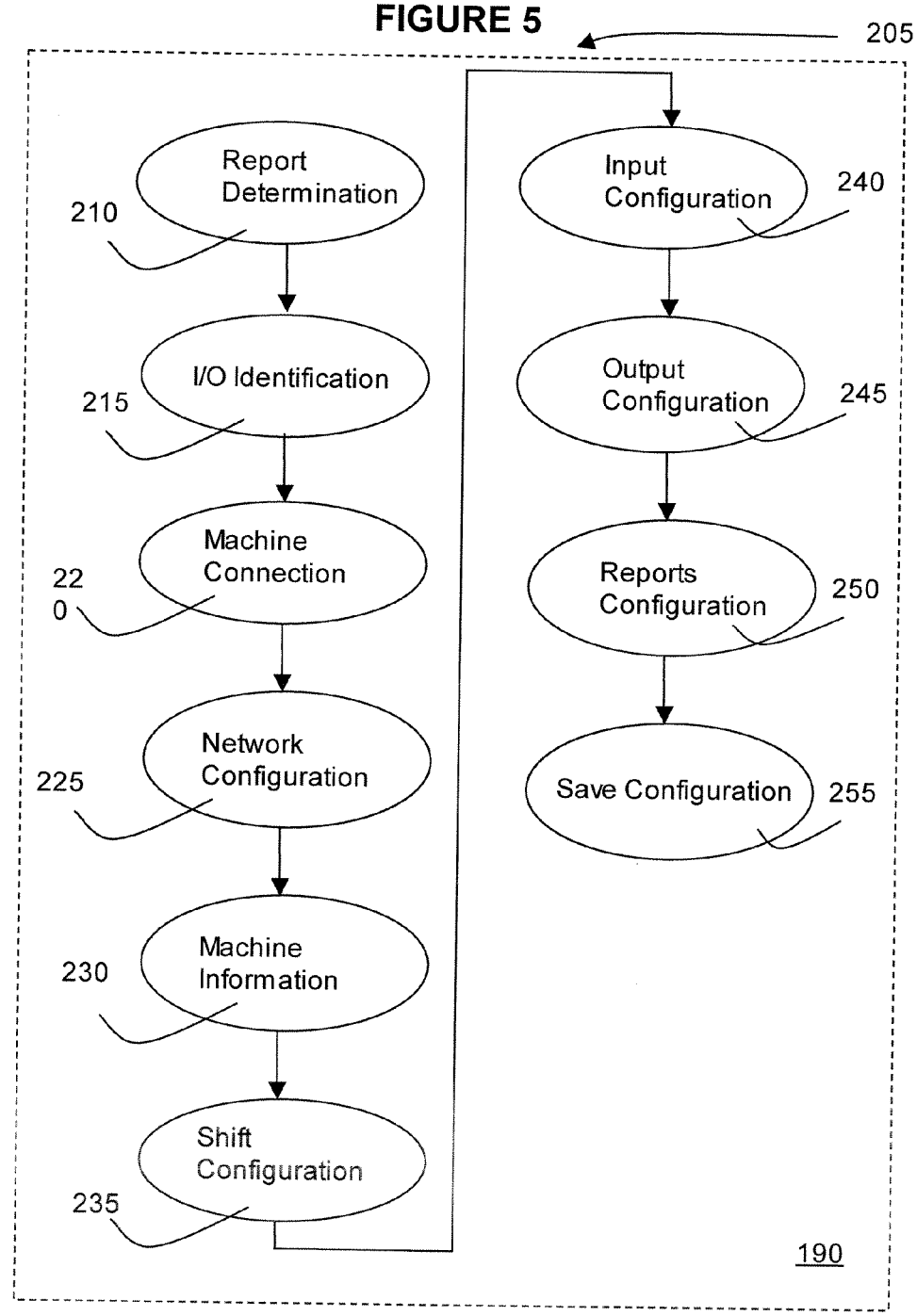
FIG. 5 is a flowchart of the MMD configuration step of FIG. 4.

Reference is now made to FIG. 5, a flowchart of the MMD configuration step 190 of FIG. 4, shown generally as 205. Beginning with the report determination step 210, the user determines what type of reports the user desires and the information required for such reports. Examples of reports include: machine status reports, signal reports, maintenance reports, product count reports, and alarms.

Machine status reports monitor the time the machine 15 is in a given state. For example, the report might show the relative times that the machine 15 has been running, cutting, undergoing maintenance, idle, off, etc. Machine status reports can be cumulative or chronological. A cumulative machine status report may provide a pie chart that shows the proportions of the time interval during which the machine 10 was in each state. For a chronological machine status report, a bar chart may be used to illustrate which states the machine 10 was in at each moment over a given interval of time. Machine status reports require that the user determine which states that the user wants to monitor.

Signal reports plot information over time, such as temperature, vibration, spindle load, and cabinet humidity. These reports thus allow users to see trends in the signal but also what is occurring in real time. The user can also define limits which can be displayed on the chart and the user can choose to have the engine 140 generate alarms and/or send e-mails as the limits are approached or surpassed. This report requires that the user determine the information to be monitored, applicable limits, and actions to be taken as limits are approached or surpassed.

Maintenance reports determine whether fault information is available from the machine 15 (via the RS232/RS485 serial ports 65) and to track fault information. Faults can be recorded with a start and end time along with their duration. The reports can be cumulative maintenance reports, which display bar charts for the length of each fault. The reports can also be chronological maintenance reports which show the status of each fault type over a given period of time. Finally, maintenance reports can also be preventative maintenance meter type reports. These reports allow a user to work with an input like a car does with its odometer. The user can reset the meter at any time and let it keep track of the input for a predefined time interval. Maintenance reports require that a user identify the type of fault to be monitored as well as the desired time intervals.

A product count report displays a bar chart that shows production count, such as number of units produced by a machine 15, over the course of a shift or number of shifts. Usually a digital signal is used to determine a completed cycle and a factor is used by the engine to determine how many parts were produced from that cycle. However, with serially input data using a serial RS232/RS485 port 65, a user can gather batch and part numbers to reference identification information with the part count data. The user must identify the desired information and time intervals required for this report.

Alarms can be based on any signal, real or derived. Alarms can be emails generated by the engine 140 and sent to a CD 35. The engine 140 can also allow for a delay so that the same alert can be escalated to multiple people within an organization. The user must identify the events for which they wish to have an e-mail notification generated, to which e-mail address the notification should be directed and what the time delay should be applied before sending the e-mail (time delay relative to when the alarm occurred). Multiple email notifications can be configured with different time delays and different recipients for the same alarm. Thus, an e-mail notification can be sent, as an e-mail notification escalation, to increasing numbers of people at increasing levels of authority as time goes on if the condition that has caused the e-mail notification for an alarm to be generated is not corrected.

Next, at the input/output identification step 215, the user must identify the inputs required to capture the information required for the reports. Thus, for each report desired the user must determine which inputs and outputs are necessary to generate or provide the information required for the report and the signals required to provide such inputs and outputs. These will determine which combinations of digital input connectors 50, analog input connectors 55, digital output connectors 75, and serial RS232/RS485 ports 65 are necessary. The signals available will vary by type of machine 15. From an input perspective, a combination of digital signals may be used to derive the desired information or machine state. Analog inputs also may be combined with digital inputs to provide additional information. For example, an analog voltage input may be used to indicate when the machine 15 is cutting versus whether the machine 15 is simply running or not, as might be indicated by a digital input. As for outputs, the user will have to decide which output connectors 70 to a machine 15, or serial RS232/RS248 ports 65, or Ethernet port 85 may be used to provide the required MMD output signals.

Next, at the machine connection step 220, the user connects the appropriate outputs from the machine 15 to the corresponding digital input connectors 50, analog input connectors 55, and serial RS232/RS485 ports 65 on the MMD 20 to provide the inputs required. For example, digital outputs from the machine are connected to digital input connectors 50 on the MMD 20, analog outputs are connected to analog input connectors 55 on the MMD 20. Serial connections from the machine are connected to the serial RS232/RS485 ports 65 to provide serial inputs and outputs. As well, any additional digital, analog or serial inputs can be added to bring data into the MMD 20. Digital outputs to the machine 15 are ensured by connecting digital output connectors 75 from the MMD 20 to digital inputs on the machine 15 or machine lights such as LEDs. The user may also connect an Ethernet-enabled machine 15 to the Ethernet port 85 to provide inputs at this time. However, preferably, such a machine will be connected to the network 25, over which the machine 25 will communicate with the MMD 20.

Moving now to the network configuration step 225, the user may connect a CD 35 directly to the MMD 20 to configure the internet Protocol (IP) settings by which the MMD 20 will communicate with the network 25. A network configuration utility allows the user to set parameters for the IP address, the domain name server (DNS) address, the gateway address, the subnet address information, and whether Dynamic Host Configuration Protocol (DHCP) services are available. After the IP configuration information has been entered, the user may connect the MMD 20 to the network 25 via the Ethernet port 85 which will allow the user to continue configuration via a web page user interface from any CD 35 on the network 25 or from a CD 35 directly connected to the MMD 20. To do so, the user enters the IP address of the MMD 20 device from any web browser enabled CD 35. The web server 165 then generates an initial web page interface containing a menu of configuration and reports options and transmits it to the CD 35. From this web page interface, the user selects the configuration option. This causes a configuration web page user interface to be generated by the configuration CGI module 170. From the configuration web page interface, the user then selects the desired configuration items, which causes the configuration CGI module 170 to generate additional pages for entering or viewing the appropriate configuration information.

For example, if a user wishes to configure inputs, the user first selects configuration from the initial web page user interface menu, which causes the configuration CGI module 170 to generate the configuration web page user interface containing the configuration options. From this page, the user then selects the option for configuration of inputs. This causes the configuration CGI module 170 to generate another web page containing the necessary fields into which the user may enter the information necessary for configuring the input. This information is transmitted back to the configuration CGI module 170 which processes the configuration information entered and transmits it the configuration interface module 135 which, in turn, stores it in the flash memory 100 and transmits it to the appropriate modules.

Proceeding now to the machine information step 230, the user enters basic machine 15 and MMD 20 information via one or more web page user interfaces generated for this purpose by the configuration CGI module 170. This information includes, among other things: a device name to associate the MMD 20 with the machine 15 to which it is connected, system user names and corresponding passwords, whether the user desires that digital signals for alarms be inverted, IP address information if not already provided, and the IP address of a time server for providing time information. If desired, the user may also choose to import or export configuration information to/or from a file on the user's CD 35.

Moving next to the shift configuration step 235, the user defines the shifts that are used in the reports generated by the reports CGI module 155 and reporter module 160. The shifts are used to determine default time intervals for reporting purposes and refer to the period between a scheduled start and end time for workers or machines 15. Relevant shift information is eventually forwarded to the reports CGI module 155 and reporter module 160. To configure shifts, the user selects the shift configuration option from the configuration web page user interface. This causes a shift configuration web page user interface to be generated by the configuration CGI module 170. The user then enters information into the shift configuration web page user interface to assign a name to each shift, define the time intervals applicable to the shift, and assign a color to be used to represent the shift in reports that display graphical representations of machine data for the shift.

Moving now to the input configuration step 240, the user enters the configuration information for the inputs identified during the input and output identification step 215. For each input from the machine 15, the user enters a variable name and any transformations to be performed by the engine 140. For each input, the user also enters the associated MMD 20 digital input connector 50, MMD 20 analog input connector 55, IP address for machines 15 providing Ethernet inputs, or MMD serial RS232/RS285 port 65. For example, for digital inputs, users may choose to flatten or invert the digital signal. For analog inputs, it is often desirable to specify a scaling method for the analog signal. For serial inputs, such as data received from bar code readers, it may be desirable to specify a bit mask. The variable names and the operations to be effected are eventually forwarded to the engine 140 for use in handling the inputs. This information is entered and viewed via web page user interfaces created by the configuration CGI module 170.

Next, during the output configuration step 245, MMD outputs and output variables are configured. These may include the generation of MMD 20 output signals which are transmitted by the engine 140 via the output connectors 70. During this step, the user selects an output configuration option from the menu item on the configuration web page user interface. This causes the configuration CGI module 170 to generate an output configuration web page user interface. Using this interface, the user defines additional transformations which are to be effected by the engine 140 on the variables assigned to inputs in the input configuration step 240. The result of such a definition is a new variable which can, if desired, be used as an input for another transformation defined during this phase of configuration. Thus, the user continually adds transformations and creates new variables until the user has defined variables that represent the information necessary for report variables. All of the variables and operations are eventually forwarded to the engine 140 which, once the MMD 20 is configured and operating, carries out the desired transformations on the variables and sends the resulting report variable to the database manager 175. Once the variables are established, the user may also choose to have any or all of them, including report variables, forwarded on to an Object Link Embedding for Process Control (OPC) server automatically for another application to access. For example, if a user desired that a digital input, input A, be inverted and compared for logical equivalence with another digital input, input B, the user would first define the variable names for each input during the input configuration step 240 and would also specify that the value of input A was to be inverted. Then, during the output configuration step 245, the user would specify that the value of input A is to be compared to the value of input B for logical equivalence and that the result be stored in another variable. The user could then define another transformation using the variable containing the result of the logical equivalence comparison. The result of this last transformation would be stored in still another variable defined by the user and associated with this last transformation.

It is during the output configuration step 245 that the IP address of any MMD 20 designated to monitor the status of other MMDs 20 is entered. If such an address is entered and the user activates this monitoring feature, then, during initialization, the MMD 20 will send machine status information (such as whether the machine is running or not) and the MMDs 20 IP address to the designated MMD 20. Monitored MMDs 20 will only transmit new machine status information to the designated MMD if there is a change in status. This information is used by the web server 165 of the designated MMD 20 node to allow the user to navigate from MMD 20 to MMD 20 in a list, such as a hierarchal tree, and view the reports and basic machine 15 running status of each MMD 20.

Proceeding now to the reports configuration step 250, the user defines and configures the reports. From the configuration web page user interface, the user selects the reports configuration option. This causes the configuration CGI module 170 to generate a web page menu of all the different report types. From this menu, the user selects the desired report type and the configuration CGI module 170 generates a web page user interface for entering and viewing the configuration information for a report of the selected type. The user then enters the required information for generating the report. This information includes the variable names to be used as the values displayed in the report. These are the variables that are stored in the database 180. Additional information, such as color information for graphs displayed in reports and labels for fields may also be entered. The user repeats this process for all reports desired.

For certain reports and values, the user may specify whether the engine 140 should send e-mail notifications, as well as the recipients, frequency, and delays of such notifications. The user may also choose to have all reports automatically forwarded by the reporter module 160 to a CD 35 on the network 25 for archiving or use by another application.

The report variable names, report types, and structures to be stored in the database are eventually forwarded, via the configuration interface module 135, to the database manager 175 which creates a table for each report. Variables names to be monitored for e-mail notifications, as well as notification parameters, are forwarded to the engine 140. Report types and required information, such as variable names required and shift, time interval or color information, are forwarded to the reports CGI module 155 and, if the user has opted to have the reporter module 160 automatically forward reports in CSV or Microsoft Excel format to a CD 35 on the network 25 at given intervals, to the reporter module 160 as well.

Moving now to the save configuration step 255, the user may elect to save configuration information to the flash memory 100. If the user so chooses, the configuration CGI module 170 transmits the configuration information to the configuration interface module 135 which writes the information to the flash memory 100. The configuration interface module 135 may then access the configuration information in the flash memory 100 and forward the appropriate configuration information to the other modules. The user may subsequently alter the configuration by again choosing the configuration option from the initial web page generated when the MMDs 20 IP address is entered on the user's CD 35.

The above configuration procedure is provided as an example. It is not the intention of the inventors to limit the configuration procedure to the order specified above. It will be apparent to one skilled in the art that the order and content of some steps may be modified.

Figure 6:
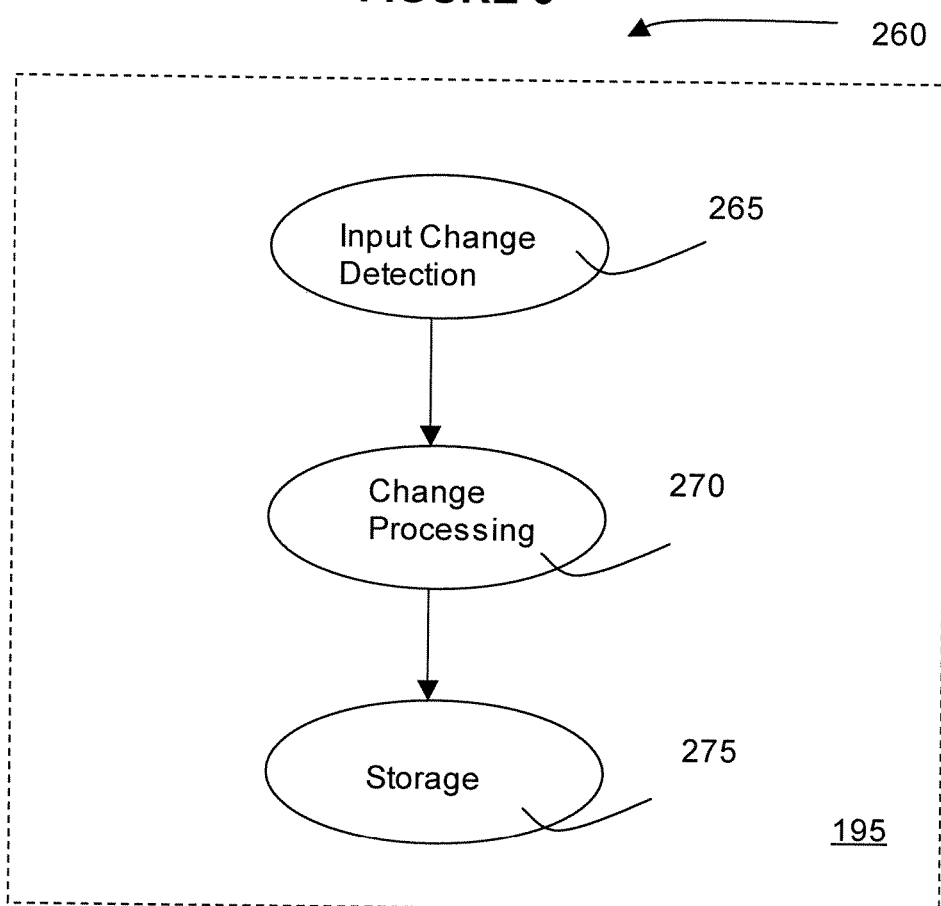
FIG. 6 is a flowchart of the monitoring step of FIG. 4.

Reference is now made to FIG. 6, a flowchart, shown generally as 260, of the monitoring step 195 of FIG. 4. Beginning with the input change detection step 265, the engine 140 automatically monitors the machine 15 for input changes via the drivers 150. The engine 140 may also issue MMD 20 output signals and e-mail notifications during this step 265. For example, the engine 140 may be configured to issue an MMD 20 output signal or e-mail notification after the machine 15 has been in a certain state for 15 seconds. Thus, the state of the input will not have changed when MMD 20 output signal or e-mail notification is triggered. Next, at the change processing step 270, the engine 140 processes any detected input change by effecting transformations on the input change, which may result in changes to the values of report variables, and issues any MMD 20 output signals or e-mail notifications required as a result of the transformations. The transformations undertaken are based on the configuration information. Finally, at the storage step 275, changes in the values of report variables are forwarded to the database manager 175 which stores them in the appropriate format and table of the database 180, based on the MMD 15 configuration information.

Figure 7:
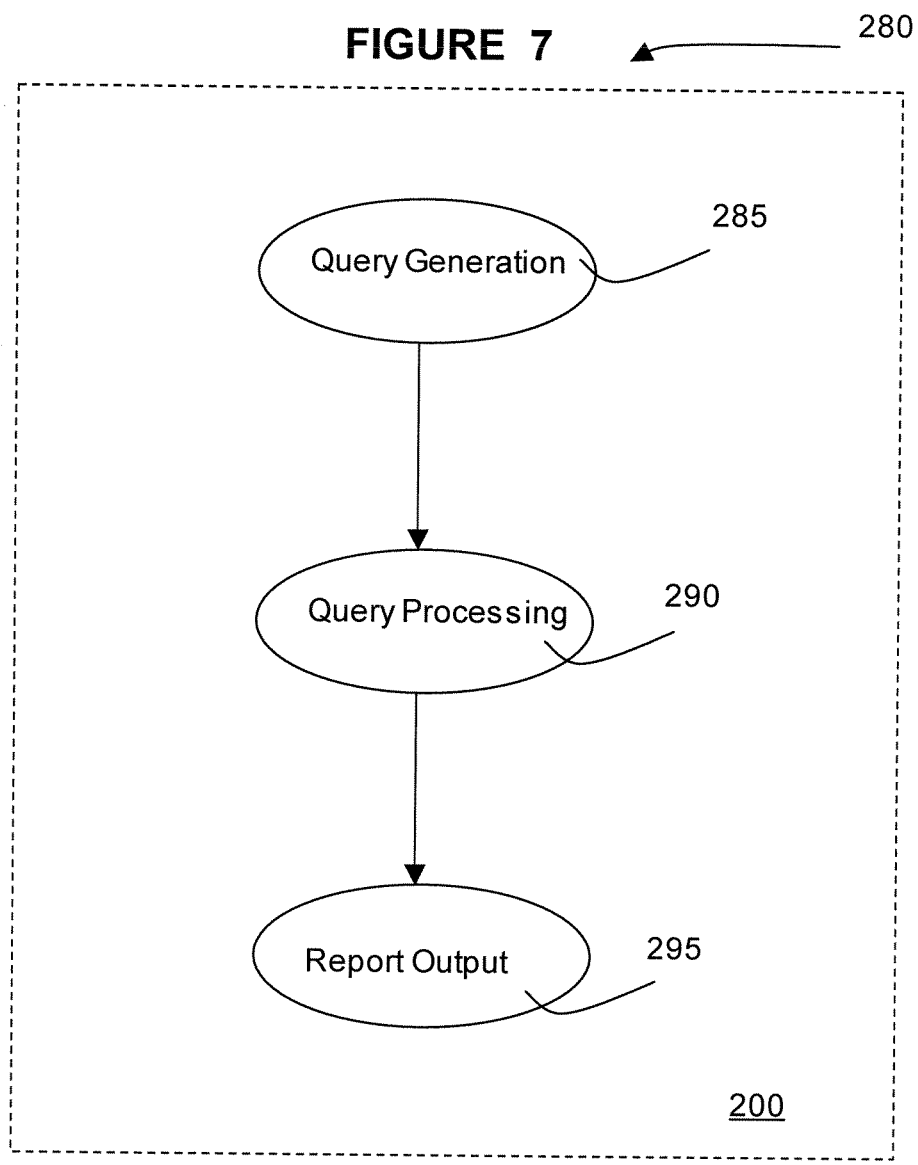
FIG. 7 is a flowchart of the reporting step of FIG. 4 for automated reports.

Reference is now made to FIG. 7, a flowchart of the reporting step 200 of FIG. 4 for automated reports. This flowchart is shown generally as 280. The MMD 20 may automatically generate reports at certain time intervals, depending on whether this option is chosen during the configuration step 190. Beginning with the query generation step 285, the reporter module 160 generates an SQL query and transmits it to the database manager 175. Next, at the query processing step 290, the database manager 175 executes the query by interrogating the database 180 and transmits the result back to the reporter module 160. Finally, at the report output step 295, the reporter module 160 receives the query results, transforms them into one or more reports in the format specified in the configuration information, and transmits the report over the network 25 to a CD 35. The report may be stored on the CD 35 for archival purposes and/or used by the user or other applications, such as factory/plant automation software.

Figure 8:
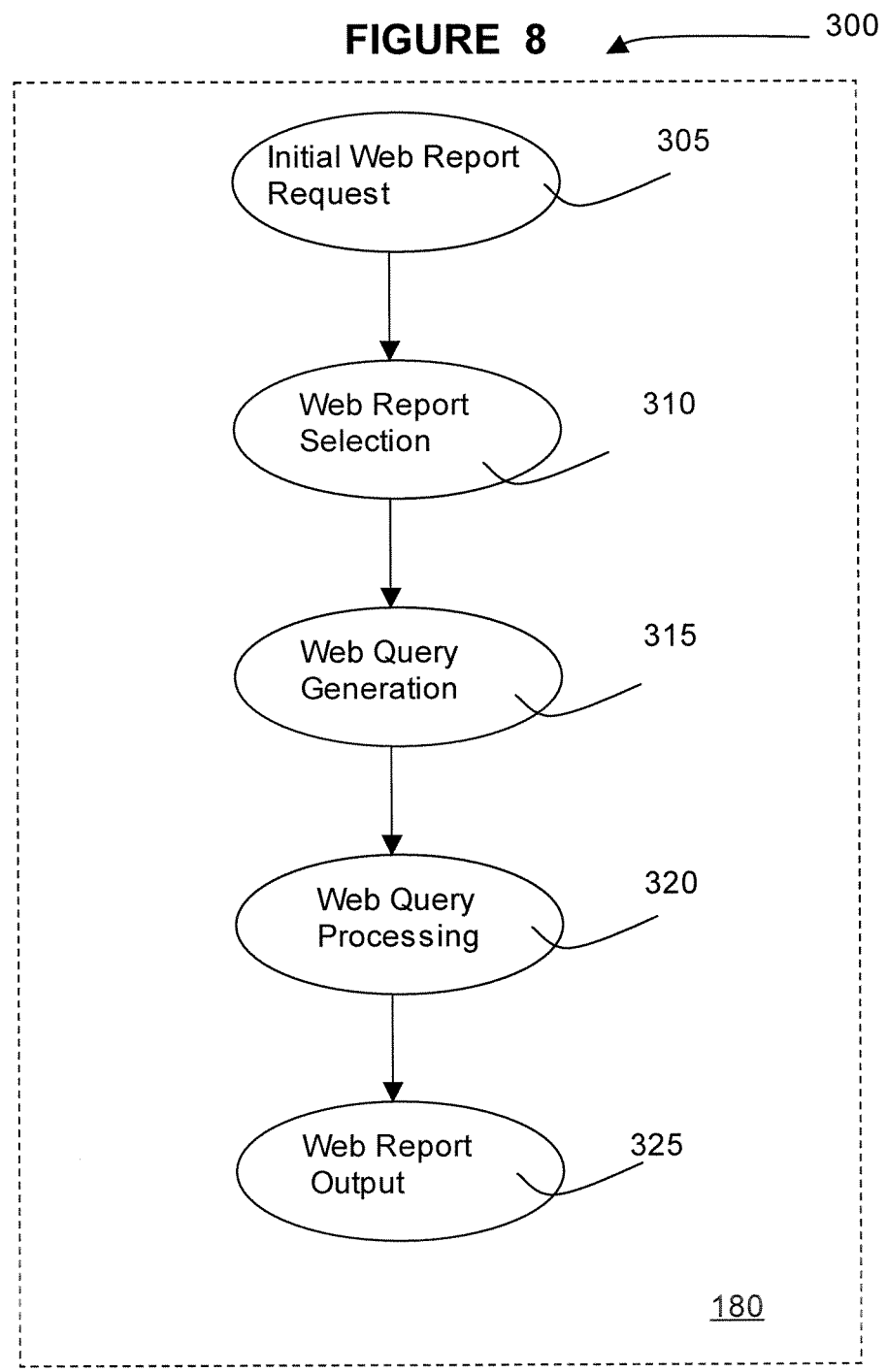
FIG. 8 is a flowchart of the reporting step of FIG. 4 for user requested web page reports.

FIG. 8 is a flowchart of the reporting step 200 of FIG. 4 for user requested web page reports, shown generally as 300. Beginning with the web report request step 305, the user enters the IP address of the MMD 20 attached to the machine 15 the user wishes to view. The web server 165 then generates an initial web page user interface menu from which the user may choose to view reports or enter or view configuration information. The user selects the option to view reports and the reports CGI module 155 generates a report selection web page user interface from which the user may choose a report to view. Next, at the web report selection step 310, the user selects a report from the web page report selection user interface menu. If the report selected requires that the user enter parameters for generating the report, the reports CGI module 155 generates a web page user interface for the desired report from which the user enters the required parameters. If, however, the report does not require a user to enter parameters, or if default values for the report were specified during configuration, the parameter entry web page user interface will not be displayed and the reporting step will automatically to the next step. These scenarios are not shown in FIG. 8. Next, at the web query generation step 315, the reports CGI module 155 generates an SQL query which is sent to the database manager 175. This query incorporates any parameters entered by the user during the web report selection step 310. Next, at the web query processing step 320, the database manager 175 executes the query to obtain the desired information from the database 180 and transmits the results to the reports CGI module 155. Finally, at the web report output step 325, the reports CGI module 155 uses the information returned by the database manager 175 to generate a web page containing the report which is transmitted to the user's CD 35.

The reports CGI module 155 can constantly repeat the web query generation step 315, the web query processing step 320, and the web report output step 325 to capture and report changes in inputs and variables, as handled by the engine 140 and database manager 175. This allows the user to see the changes as they occur in real time. Also, as mentioned above, the user may specify during configuration that the reports CGI module 155 generate a series of default reports, using default parameters, that will appear as soon as the user types in the IP address of the MMD 20. In this scenario, not shown in FIG. 8, the web query generation step 315, the web query processing step 320, and the web report output step 325 are automatically undertaken for the default reports and parameters as soon as the MMDs 20 IP address is entered. The result is that the initial web page user interface menu generated by the web server 165 will display the default reports, generated by the reports CGI module 155 with default parameters, along with the menu of available reports and configuration options. Any reports subsequently chosen from the reports menu which also have default parameters specified will also be automatically generated by the reports CGI module 155 with these parameters when selected. The user then has only to enter specific parameters for reports where there are no default parameters or when the user wishes to use different parameters.

If the MMD 20 for which the IP address is entered during the web report request step 320 is designated to monitor other MMD devices, the web server 165 of that MMD 15 node will generate an initial web page user interface menu having a frame containing a list, for example a hierarchal tree, from which a user may select different MMDs 20 accessible from the designated MMD 20 for report viewing. Each entry in the list will be associated with IP address of the associated MMD and the MMDs machine status information. Actual reports will be displayed in another frame allocated to that effect. If the user desires, the machine status of each machine 15 attached to an MMD 20 can be obtained by moving a mouse pointer device over the name of the MMD 20 attached to the device on the list of MMDs. When a user selects a MMD 20, a reports request is sent to the MMD 20 selected as if the user had entered the IP address of the selected MMD 20. Subsequently, the request is handled by the selected MMDs 20 web server 165 and reports CGI module 155 as described above and shown in FIG. 8, except that all of the web report pages and menus generated are shown within the frame allocated for report viewing. The user may then navigate to another MMD 20 to view its reports by clicking on the node within the frame containing the list of MMDs. In this fashion, the user may view the reports available from a variety of MMDs 20 in succession without being obligated to type in the IP address of each successive MMD 20.

It will be apparent to one skilled in the art that various modifications to the invention and embodiment described herein are possible without departing from the spirit and scope of the invention. Accordingly, it is to be understood that the present invention has been described by way of illustration and not limitation.

The invention claimed is:

1. A system for monitoring a machine, said system comprising:
    an integrated machine monitoring device connected to said machine, said machine monitoring device comprising:
        input means connected to said machine for receiving inputs from said machine;
        an engine connected to said input means for performing transformations on said inputs, wherein said transformations apply a mathematical operation or a logical operation on said inputs to generate outputs;
        a database system connected to said engine to store said outputs; and
        report generating means connected to said database system for generating reports based on said outputs; and
    a client computing device connected to said machine monitoring device by a communications network for receiving said reports to allow a user to monitor said machine from said client computing device.

2. The system of claim 1, wherein said report generating means comprises a web server for transmitting said reports in the form of web pages to said client computing device.

3. The system of claim 2, wherein said web server further generates web page user interfaces from which said user can configure said machine monitoring device, said transformations, or said reports from said client computing device.

4. The system of claim 3, wherein said web server comprises a configuration module configured to generate web page user interfaces from which a user may enter or view configuration information from said client computing device.

5. The system of claim 2, wherein said web server comprises a reports module configured to generate web page user interfaces from which said user may request said reports and enter parameters required for said reports from said client computing device.

6. The system of claim 2, wherein said machine monitoring device is a designated machine monitoring device connected over said communications network to a plurality of machine monitoring devices, said web server of said designated machine monitoring device generating a web page user interface comprising a list of said plurality of machine monitoring devices and permitting a user to select reports from one or more of said plurality of machine monitoring devices for viewing from said client computing device.

7. The system of claim 1, wherein said report generating means comprises a reporter module for automatically generating and automatically transmitting said reports to said client computing device.

8. The system of claim 1, further comprising output means connected to said engine for transmitting said outputs via output signals.

9. The system of claim 8, wherein said output means comprises a digital output.

10. The system of claim 1, wherein said input means comprises a digital input.

11. The system of claim 1, further comprising at least one serial port configured to provide serial communications between said machine and said machine monitoring device.

12. The system of claim 1, further comprising an Ethernet port configured to provide Ethernet communications between said machine and said machine monitoring device.

13. The system of claim 1, wherein said machine monitoring device further comprises a configuration interface module configured to read and write configuration information, said configuration information being initially entered when said machine monitoring device is configured.

14. The system of claim 13, wherein said configuration interface module is further configured to maintain usernames, access and modification rights for said configuration information, and passwords for said user as part of said configuration information.

15. The system of claim 1, wherein said machine monitoring device further comprises drivers connected to said input means for converting said inputs into values associated with variables by said engine, said engine performing said transformations on said values to generate additional values for said reports, wherein said additional values are associated with report variables, said outputs are comprised of said additional values, and said reports are generated from said additional values associated with said report variables.

16. A method for monitoring a machine, said method comprising:
   monitoring inputs from said machine by means of a machine monitoring device connected to said machine;
   performing transformations on said inputs, wherein said transformations apply a mathematical operation or a logical operation on said inputs to generate outputs, said transformations being performed by an engine within said machine monitoring device;
   generating reports directly on said machine monitoring device, wherein said reports are generated by said machine monitoring device from at least one of said inputs and said outputs; and
   transmitting said reports from said machine monitoring device to a client computing device on a communications network.

17. The method of claim 16, further comprising generating e-mail notifications and e-mail notification escalations and transmitting said e-mail notifications and said e-mail notification escalations to said client computing device, said e-mail notifications and said e-mail notification escalations being generated by said machine monitoring device based on said inputs and said outputs.

18. The method of claim 16, wherein said performing transformations is performed when a change in said inputs is detected during said monitoring, said performing transformations further comprising storing changes to said outputs for said reports resulting from said transformations in a database system within said machine monitoring device.

19. The method of claim 16, wherein said generating reports further comprises:
   automatically generating a query by a reporter module within said machine monitoring device at configured time intervals or shifts;
   processing said query and transmitting data resulting from said query back to said reporter module, wherein said processing is effected by said machine monitoring device; and
   generating a report from said data to be transmitted automatically to said client computing device, said generating of said report being effected by said reporter module.

20. The method of claim 16, wherein said generating reports further comprises:
   entering the Internet Protocol address of said machine monitoring device to cause generation of a menu of available reports;
   selecting a desired report from said menu;
   generating a query for said desired report;
   processing said query and transmitting data resulting from said query to a reports module within said machine monitoring device, wherein said processing is effected by said machine monitoring device; and
   generating said desired report from said data, said generating of said desired report being effected by said reports module.

* * * * *